Aug. 5, 1952　　　　S. F. SMITH　　　　2,605,884
BALED HAY CONVEYER
Filed Feb. 8, 1950　　　　　　　　2 SHEETS—SHEET 2
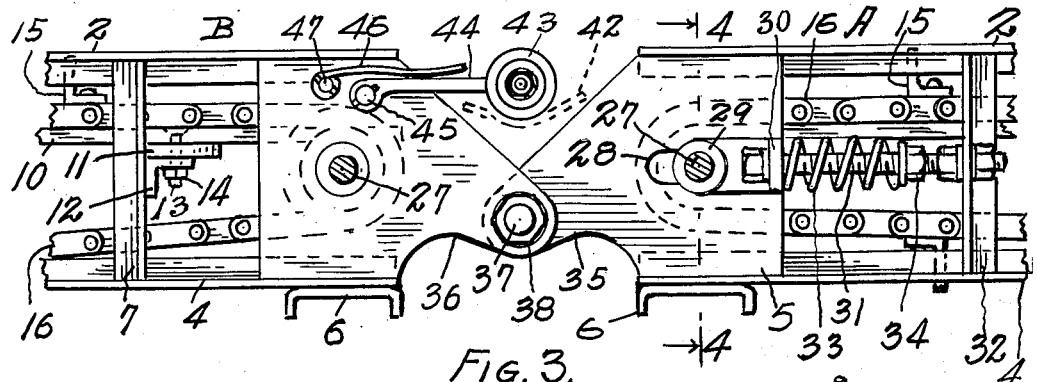
Fig. 3.
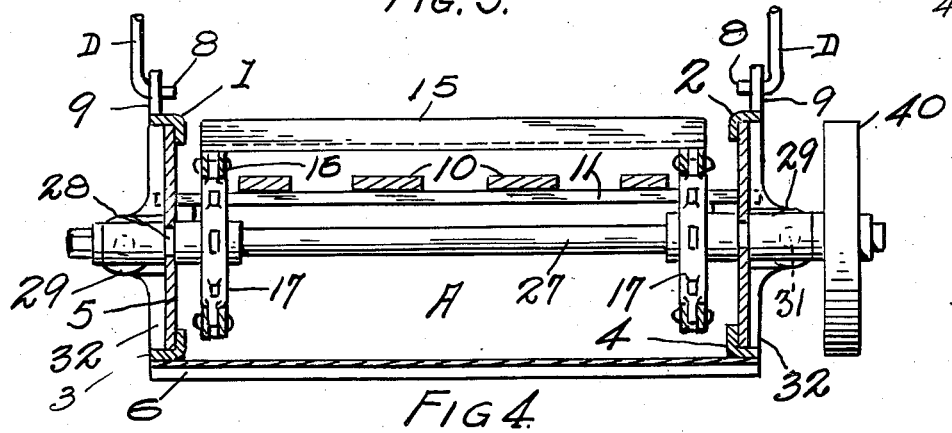
Fig. 4.
Fig. 6.　　　　　　　　　　Fig. 5.
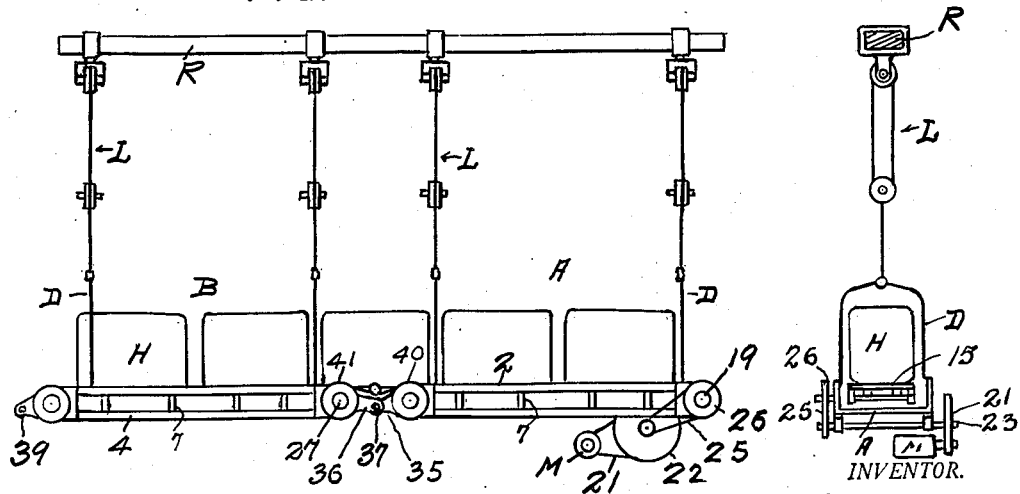
INVENTOR.
SHERWOOD F. SMITH
BY
Charles K. Davies + Son
Attys.

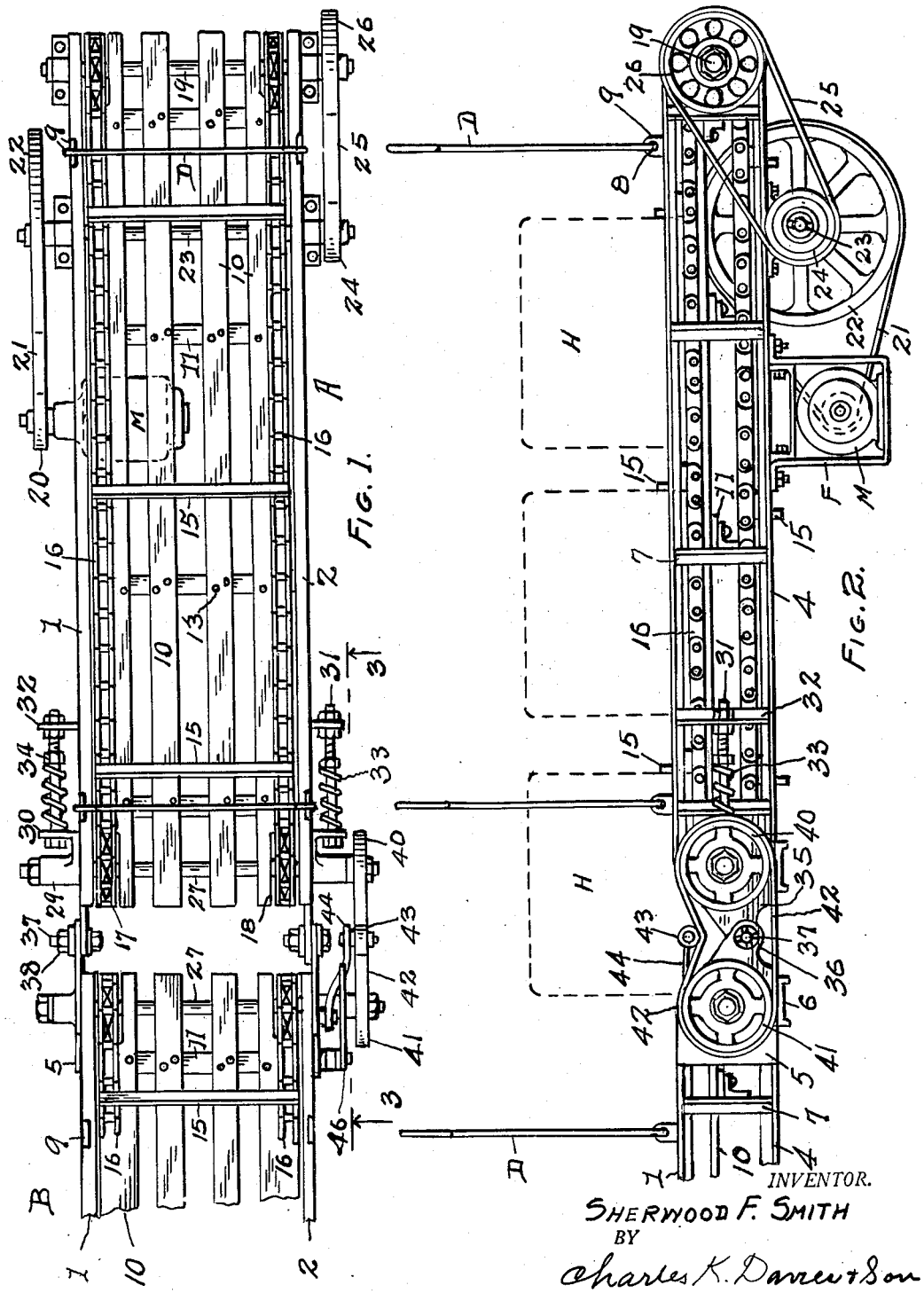

Patented Aug. 5, 1952

2,605,884

UNITED STATES PATENT OFFICE 2,605,884

BALED HAY CONVEYER

Sherwood F. Smith, Gaithersburg, Md.

Application February 8, 1950, Serial No. 143,014

3 Claims. (Cl. 198—92)

The present invention relates to the general class of power driven and portable conveyors of the sectional, single lane, and closed path, type, and more specifically to an improved baled-hay conveyor, which while well adapted for handling and transferring various kinds of material and articles, is especially designed for conveying successive bales of hay. The invention is embodied in a sectional conveyor in which the sections, or separable units are jointed or coupled in such manner that they may readily be tilted or relatively adjusted in a vertical plane for elevating and for lowering a single line of bales of hay, as for instance when the bales are being transferred from a baling press and loaded upon a truck or other carrier. The conveyor may also be employed as a transfer mechanism for loading and shipping purposes, as well as for unloading and storage purposes. For these purposes, the plural sections or units of the conveyor may be coupled together and supported from below upon a suitable base, or as hereinafter described and illustrated the sections of the jointed conveyor may be suspended from an overhead support, and relatively adjusted by hoist lines in a vertical plane. The conveyor may be extended or contracted by the use of complementary sections or units to vary its overall length in adapting it to different distances between a supply station and a discharge or delivery station.

Each of the plural sections is equipped with an endless conveyor mechanism and operating means therefor; power transmission means are employed between the jointed sections; and means are utilized between adjoining coupled sections for assuring smooth operation of the endless conveyor units and the power transmission mechanism, as will be described.

The invention consists in certain novel combinations and arrangements of these parts as will be more particularly set forth in the appended claims. The conveyor includes a minimum number of parts that may with facility be manufactured at low cost of production, and the parts may be assembled with convenience to insure a durable appliance that is simple in construction and operation and may be controlled with ease.

In the accompanying drawings I have illustrated one complete example of a physical embodiment of my invention wherein the parts are combined and arranged in accord with one mode I have devised for the practical application of the principles of the invention. It will however be understood that changes and alterations are contemplated and may be made in these mechanical structures, within the scope of my claims, without departing from the principles of the invention.

Figure 1 is a plan view showing the power section at the supply end of the conveyor, and the adjoining end of another conveyor section; and Figure 2 is a view in side elevation of this structure.

Figure 3 is an enlarged detail vertical sectional view at line 3—3 of Fig. 1.

Figure 4 is a transverse vertical sectional view at line 4—4 of Fig. 3.

Figure 5 is a diagrammatic end elevation of the conveyor on a reduced scale; and Figure 6 is a side elevation of the structure in Fig. 5.

In order that the general assembly and utility of parts may readily be understood I have disclosed in Figs. 5 and 6 a conveyor supply or power section A, and an alined and relatively adjustable section B, and it will be understood that similar sections B may be successively coupled together to extend the length of the appliance and provide a discharge or delivery section at the end of the appliance.

As here shown each section is suspended from a single rafter R, or other overhead support, by hoist lines L and pairs of longitudinally spaced bails or pivoted yokes as D, and by usual manipulation of the hoist lines each section may be tilted in a vertical plane for elevating or for lowering the bales of hay, as H, as they are successively conveyed to the left in Figs. 1, 2, and 6, for delivery in loading, as well as in unloading operations.

The supply section, or power section A, and the additional sections B for extending the length of the conveyor, are similar in construction and of approximately equal lengths, and each section includes an open rectangular frame made up of a pair of laterally spaced and longitudinally extending side bars 1 and 2, preferably of angle irons, and a complementary pair of lower side bars 3 and 4, that are rigidly united by exterior end plates 5, 5, welded or otherwise secured to the pairs of side bars. For transversely reinforcing and bracing the open frames, a number of cross bars, as 6, here shown as channel plates are welded to the lower edges or faces of the lower side bars 3 and 4, near their ends, and upright angle iron posts 7, 7, are also welded to and unite the vertically spaced pairs of side bars 1—3 and 2—4, to provide a rigid structure for a section.

The open top frame of each of the sections is also braced by means of the suspending bails or yokes D, which are pivotally journaled at 8 in bearing ears 9 welded or otherwise secured to the upper side bars 1 and 2.

Within each section of the conveyor is rigidly mounted a longitudinally extending and depressed guide chute located in a plane beneath the side bars 1 and 2, and the bales of hay, as H, are conveyed along the chute in succession, and guided by the side bars 1 and 2 that form rails to prevent lateral displacement of the bales.

The chutes are made up of longitudinally extending and laterally spaced slats, strips, or flat boards as 10 preferably of hard wood, that are mounted upon the upper faces of longitudinally spaced cross boards 11, and the cross boards are supported on angle iron bars 12 which are welded at their opposite ends to the longitudinally spaced upright posts 7. For rigidly securing the chute, screw bolts 13 are passed through holes in the slats, the cross boards, and the metal cross bars, and secured by nuts 14.

The bales of hay are loaded in suitable manner on the right hand end of the power section or supply section, and the bales are pushed along the chute, between the two guide rails 1 and 2, by means of transversely arranged and longitudinally spaced push bars 15, here shown as angle irons, and the push bars at their opposite ends are each attached to a pair of laterally spaced endless conveyor chains 16, 16, that pass around two pairs of sprocket wheels 17, 17, located at the opposite ends of the chute.

The upper working flights of the chains ride along the upper surfaces of the two outer slats of the chute, and the slats at their opposite ends are slotted at 18 to accommodate the sprocket wheels and the endless chains.

The two sprocket wheels 17, 17, at the supply end of section A are mounted to revolve with an operating shaft 19 that is journaled in bearings of the two complementary end plates 5, 5, and the shaft is driven from an electric motor M mounted in a suitable frame F attached to the under side of the frame. Power is transmitted from the motor shaft through a small drive wheel 20 and belt 21, to a larger wheel 22 mounted on a counter-shaft 23 that is journaled at the underside of the frame, and shaft 23 is equipped with a small pulley or wheel 24 over which belt 25 passes; and this belt drives the large operating wheel 26 on the operating shaft.

The two sprocket wheels 17, 17, at the discharge or outlet end of the chute are mounted upon a transversely arranged driven shaft 27 which passes through a pair of longitudinally extending slots 28 in the end plates 5, 5, and the rotary driven shaft is resiliently mounted in the side plates for adjustment, and for automatic tightening of the two endless chains of the conveyor section. For these purposes the extended ends of the shaft are journaled in bearing sleeves 29 exterior of the end plates, and each bearing sleeve has an integral angular bracket 30 mounted against the end plate and provided with a headed adjusting bolt 31 that extends through a hole in an angle iron post 32, and the threaded end of the bolt is equipped with lock nuts that coact with the post to rigidly anchor the bolt in adjusted position.

A tension spring 33 is coiled about the bolt and interposed between the bracket and an adjusting nut 34 threaded on the bolt, and the spring tends to push the bracket and bearing sleeve along the slotted end plate for extending the chains to maintain them in taut working condition.

For extending the overall length of the conveyor by the addition of alined sections to form a single path for the bales of hay, the adjoining ends of the sections are detachably and pivotally coupled together, and power transmission mechanism is employed for transferring power from the power section to and through the alined sections. For these purposes the end plates of adjoining sections, as shown by A and B, are fashioned with spaced and projecting pairs of coupling heads or joint heads 35 and 36 respectively, and each overlapping pair of coupling heads is drilled to receive a headed and detachable clamp bolt, as 37 and its lock nut 38. Section B, in Fig. 6 is also equipped with a pair of coupling heads 39 for jointing its outlet end with a third section of the conveyor.

With the axially alined coupling bolts loosened, and by manipulation of the various hoist lines, the adjoining sections may be relatively flexed or tilted in a vertical plane, as desired, the hoist lines are then made fast, and the coupling bolts are clamped by their nuts to insure rigid couplings or joints between the end plates of adjoining sections.

For transmitting rotary motion and power from one section to another section, as from the power or supply section A to the next section B, and thence in similar manner to succeeding sections of the conveyor, the projecting ends of adjoining sprocket shafts are each equipped with a pulley or wheel, as 40, 41, over which a belt 42 passes, and a belt-tightener is provided which automatically adjusts the belt with relation to the two pulley wheels as the coupling joint is flexed and maintains the belt in taut working condition after the sections have been adjusted in a vertical plane, about the alined coupling bolts as a center.

The automatic belt tightener is illustrated as a small roller 43 that is journaled on the free end of a lever arm 44 which is hinged or pivoted at 45 on an end plate 5, and the roller is resiliently retained against and in frictional contact with the upper flight of the belt by suitable means, as a leaf spring 46 that is anchored at one end to the end plate.

Having thus fully described my invention, what I claim as new and desire to secure by Letters Patent is:

1. In a baled-hay conveyor the combination with an overhead longitudinally extending support, a pair of aligned sections pivotally connected at their adjoining ends, and a plurality of vertically adjustable means for suspending each section from the support, of an endless conveyor mounted in each section, each conveyor including a rotary shaft, spaced laterally of said pivotal connection; resilient means coacting with said shafts for automatically tightening the conveyors, a pair of pulley wheels on said shafts, a power transmitting belt mounted on said pulley wheels, a spring-pressed roller mounted on a section for tightening the belt, and means for driving one of said conveyors.

2. In a baled-hay conveyor, the combination with an overhead longitudinally extending support, a pair of alined sections pivotally connected at their adjoining ends for vertical adjustment, and means for securing the sections in adjusted position, a pair of longitudinally spaced bails mounted on each section, and vertically adjustable means connecting each bail with said support, of an endless conveyor mounted in each section and means for driving one of said conveyors, each conveyor including a rotary shaft spaced laterally of the pivotal connection, spring pressed bearings for the shafts mounted in the adjoining sections for tightening said endless conveyors, a pulley wheel mounted on each said shaft and a power transmitting belt mounted on the pulley wheels, a spring pressed lever mounted on one section, and a roller journaled on said lever in contact with the belt for tightening the belt.

3. In a single path bale-hay conveyor, the combination with an overhead longitudinally extending support, a pair of longitudinally alined sections each having an endless conveyor unit, adjustable means coacting with the support and each section for suspending the sections in a vertical plane, power transmission mechanism operatively connecting said units, and power operated means for activating one of the units, of a pair of laterally spaced end-plates mounted on each of the adjoining ends of the sections and terminating in pairs of lapped bearing heads, and a pair of transversely arranged pivot bolts and lock nuts thereon for clamping together the lapped coupling heads.

SHERWOOD F. SMITH.

REFERENCES CITED

The following references are of record in the file of this patent:

UNITED STATES PATENTS

| Number | Name | Date |
|---|---|---|
| 302,599 | Stephan | July 29, 1884 |
| 443,089 | Good | Dec. 23, 1890 |
| 1,165,460 | Steele | Dec. 28, 1915 |
| 1,510,479 | Hoven | Oct. 7, 1924 |
| 1,548,842 | Keller | Aug. 11, 1925 |
| 2,222,316 | Maguire | Nov. 19, 1940 |
| 2,530,496 | Watson | Nov. 21, 1950 |